Patented Aug. 21, 1945

2,383,255

UNITED STATES PATENT OFFICE 2,383,255

DYESTUFF INTERMEDIATES

John David Kendall, Ilford, England, assignor to Ilford Limited, Ilford, England, a British company No Drawing. Application April 9, 1943, Serial No. 482,494. In Great Britain April 23, 1942

18 Claims. (Cl. 260—302)

This invention relates to the production of dyestuff intermediates which are of value in the synthesis of dyestuffs capable of optically sensitising silver halide photographic emulsions.

The new dyestuff intermediates of this invention are compounds of the general Formula I:

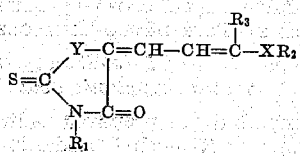

(I)

where $X$ and $Y$ each represent an oxygen atom or a sulphur atom, $R_1$ is a hydrogen atom or a hydrocarbon group and $R_2$ and $R_3$ are hydrocarbon groups.

According to this invention dyestuff intermediates of the above general Formula I are produced by reacting a compound of the general Formula II:

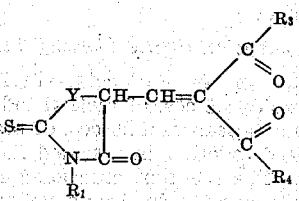

(II)

(where $R_4$ is a hydrocarbon group and the other symbols have the meanings assigned to them above) with a mercaptan or a trithio-orthoformic ester to produce a dyestuff intermediate of the type where $X$ is a sulphur atom, or with an ortho formic ester to produce a dyestuff intermediate of the type where $X$ is an oxygen atom, the reaction being effected in the presence of a mineral acid or an alkyl or aralkyl salt of a mineral acid, and in the presence of a solvent for the reactants.

The production of compounds of general Formula II may be effected by condensing rhodanic acid (2-thio-4-keto-tetrahydro-thiazole) or oxarhodanic acid (2-thio-4-keto-tetrahydro-oxazole) with a 2-alkoxy-methylene-1:3-diketone, in the presence of a solvent and an alkaline condensing agent. The reaction takes place as follows:

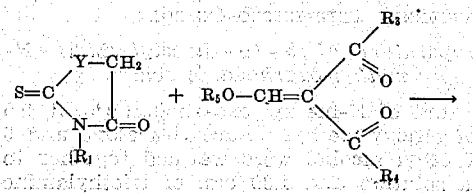

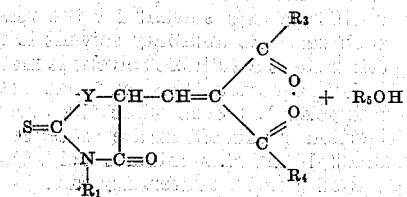 $+ R_5OH$ (The groups $R_1$, $R_3$, $R_4$, $X$ and $Y$ have the meanings assigned to them above and the group $R_5$ is an alkyl group).

The production of the dyestuff intermediates according to the present invention occurs according to the following equations:

(a) *Using a mercaptan*

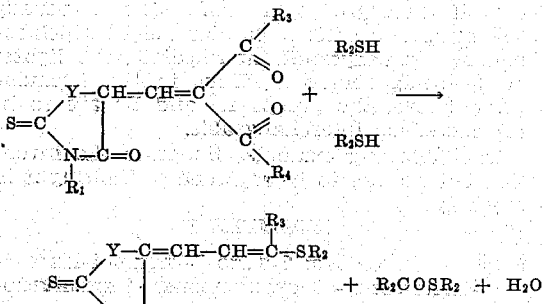

(b) *Using a trithio ortho formic ester*

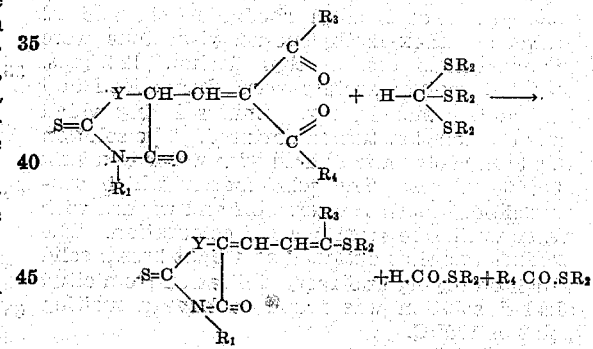

(c) *Using an ortho formic ester*

This reaction follows the same course as (b) above, differing only in that all the —$SR_2$ groups are —$OR_2$ groups.

As indicated above, the group $R_1$, $R_2$, $R_3$ and $R_4$ may be hydrocarbon groups. The expression "hydrocarbon groups" is to be understood as including alkyl groups, e. g. methyl, ethyl, propyl or higher alkyl groups, aralkyl groups, e. g. benzyl and naphthyl-methyl groups, aryl groups, e. g. phenyl and naphthyl groups, and unsaturated hydrocarbon groups, e. g. allyl and cinnamyl groups. Preferably the groups R3 and R4 are lower alkyl groups. Equivalent groups, however, include the above "hydrocarbon groups" which are substituted and contain in place of hydrogen atoms substituent groups, e. g. hydroxyl, alkoxy, amino, substituted amino, alkyl and substituted alkyl groups, or halogen atoms.

As indicated above, the reaction to produce dyestuff intermediates according to this invention is effected in the presence of a mineral acid or an alkyl or aralkyl salt of a mineral acid, and in the presence of a solvent. A suitable mineral acid is hydrochloric acid and, of the salts, the alkyl halides are of particular value. In some cases where a mercaptan is used, the mercaptan itself acts as a solvent for the reactants and in such cases no auxiliary solvent is necessary. In other cases a suitable solvent is methyl alcohol.

It is a curious fact, and has been checked by analysis, that even when the process of the invention is effected in the presence of an alkyl or aralkyl salt of a mineral acid, the product obtained is not a quaternary salt.

It will be observed from general Formula II given above that the initial compound contains groups R3 and R4 which, though they may be different, are really equivalent groups. For the sake of simplicity, in the formulae given above it has been assumed that the group R3 remains in the final dyestuff intermediate while the group R4 is split off. In actual practice it is found that if these groups are different it is usually the group of greater molecular weight which remains in the dyestuff intermediate, the lighter group being removed. Thus in the formulae given above, the groups R3 and R4 are to be considered as interchangeable.

The following examples illustrate the invention but are not to be regarded as limiting it in any way:

EXAMPLE 1

PREPARATION OF THE 2-THIO-3-ETHYL-4-KETO-5- ($\gamma$-ETHYLTHIO - CROTONYLIDENE) - TETRAHYDRO-THIAZOLE (a) *Preparation of 5-($\omega$-diacetyl-vinyl)-N-ethyl rhodanic acid*

20 grams of N-ethyl rhodanic acid and 23 grams of ethoxymethylene-acetyl-acetone were dissolved in 62 ccs. of ethyl alcohol. 12.2 gms. of fused sodium acetate were then added and the whole refluxed for 20 minutes during which time the solution turned dark red. The solution was then cooled and diluted with water to a bulk of 500-700 ccs. The solid matter which separated out was then filtered off and washed with water until free from the red colouration. The product was thus obtained as a light brown solid which on drying and recrystallisation from ethyl alcohol solution was found to have a melting point of 105° C.

(b) *Preparation of the dyestuff intermediate*

10 grams of 5-($\omega$-diacetyl-vinyl)-N-ethyl-rhodanic acid, 18 ccs. of ethyl mercaptan, 4.6 ccs. of methyl iodide and 40 ccs. of methyl alcohol were placed in a sealed flask and allowed to stand. After 5 to 6 hours the solids were all in solution and after three days standing, the desired dyestuff intermediate began to be deposited. It was separated by filtration and washed with methyl alcohol. It was found to have a melting point of 116° C.

(c) *Alternative preparation of the same dyestuff intermediate*

5 gms. of 5-($\omega$-diacetyl-vinyl)-N-ethyl rhodanic acid, 9 ccs. of ethyl mercaptan and 20 ccs. of methyl alcohol were placed in a flask fitted with an inlet tube and a water condenser. The flask was placed in a freezing mixture and hydrochloric acid gas was passed in for 30 minutes. The reaction mixture was then allowed to stand for 24 hours and during this time an oily solid was precipitated. The liquid was decanted and the solid was recrystallised from ethyl alcohol solution this yielding the product as light brown crystals melting at 116° C. as before. A further quantity of the intermediate can be obtained by evaporating the decanted liquors in a desiccator and recrystallising (from ethyl alcohol solution) the solid which separates.

EXAMPLE 2

PREPARATION OF THE DYESTUFF INTERMEDIATE 2-THIO-3-METHYL-4-KETO-5-($\gamma$-ETHYLTHIO-CROTONYLIDENE)-TETRAHYDRO-THIAZOLE (a) *Preparation of 5-($\omega$-diacetyl-vinyl)-N-methyl-rhodanic acid*

This compound was prepared as in Example 1a using 18 gms. of N-methyl rhodanic acid instead of the 20 grams N-ethyl rhodanic acid. The product was obtained as a light brown solid melting at 124° C.

Instead of using fused sodium acetate there may be employed 12 ccs. of diethylamine. However, in this case it is desirable to acidify the diluted liquors with 7.5 ccs. of glacial acetic acid to decompose any diethylamine salt which may have formed.

(b) *Preparation of the dyestuff intermediate*

8.2 gms. of 5-($\omega$-diacetyl-vinyl)-N-methyl-rhodanic acid, 3.6 ccs. of methyl iodide, 14.5 ccs. of ethyl mercaptan and 20 ccs. of methyl alcohol were reacted together in a sealed flask as in Example 1b. The reaction proceeded similarly and the product was obtained as a yellow crystalline solid melting at 134° C.

(c) *Alternative preparation of the same dyestuff intermediate*

2.5 gms. of 5-($\omega$-diacetyl-vinyl)-N-methyl-rhodanic acid, 3.6 ccs. of trithio ethyl ortho-formate, 1.24 ccs. of methyl iodide and 20 ccs. of methyl alcohol were mixed together in a small flask and allowed to stand for one day. The flask was then heated for ten minutes on a water bath and again allowed to stand for one day. The desired dyestuff intermediate separated out and was filtered off and recrystallised from ethyl alcohol. It was found to have, as before, a melting point of 134° C.

EXAMPLE 3

PREPARATION OF THE DYESTUFF INTERMEDIATE 2-THIO-3-METHYL-4-KETO-5-($\gamma$-ETHYLTHIO-CROTONYLIDENE)-TETRAHYDRO-OXAZOLE (a) *Preparation of 5-($\omega$-diacetyl-vinyl)-N-methyl-oxarhodanic acid*

1.31 gms. of N-methyl oxa-rhodanic acid, 2.0 gms. of ethoxy-methylene-acetyl-acetone and 5 ccs. of ethyl alcohol were warmed together to form a solution and 1.39 ccs. of triethylamine was added. The solution was heated for 30 minutes during which time it turned red. The solution was then diluted to 40 ccs. with water, cooled, acidified with 0.8 cc. of glacial acetic acid, and the reddish solid which precipitated was filtered off. On recrystallisation of this solid from ethyl alcohol solution the desired compound was obtained as a light brown solid melting at 152° C.

(b) *Preparation of the dyestuff intermediate*

3.5 gms. of 5-(ω-diacetyl-vinyl)-N-methyl-oxarhodanic acid, 6.4 ccs. of ethyl mercaptan, 1.8 ccs. of methyl iodide and 10 ccs. of methyl alcohol were placed in a sealed flask and allowed to stand for 3 days. The reaction mixture was then refluxed on a water bath for 3 hours and then allowed to cool. The desired dyestuff intermediate crystallised out and after separation and boiling out with 30 ccs. of ethyl alcohol it was obtained as yellow needles melting at 178° C.

EXAMPLE 4

PREPARATION OF THE DYESTUFF INTERMEDIATE 2-THIO-3-ETHYL-4-KETO- 5-(γ-ETHYLTHIO - CROTONYLIDENE) -TETRAHYDRO-OXAZOLE (a) *Preparation of 5-(ω-diacetyl-vinyl)-N-ethyl-oxarhodanic acid*

7.25 gms. of N-ethyl oxarhodanic acid, 10 gms. of ethoxy-methylene-acetyl-acetone, 25 ccs. of ethyl alcohol, 7 ccs. of triethylamine and 4 ccs. of acetic acid were used and the preparation effected as in Example 3a. The product was obtained as light brown crystals, melting at 132° C.

(b) *Preparation of the dyestuff intermediate*

3 gms. of 5-(ω-diacetyl-vinyl)-N-ethyl-oxarhodanic acid, 5.2 ccs. of ethyl mercaptan, 1.46 ccs. of methyl iodide and 20 ccs. of methyl alcohol were mixed together, refluxed for 1 hour, allowed to stand for 24 hours and then refluxed for a further 3 hours. After further standing the solid material which precipitated was filtered off and boiled out with ethyl alcohol, yielding the product as crystals melting at 157° C.

EXAMPLE 5

PREPARATION OF 2-THIO-3-METHYL-4-KETONE-5-(γ-ETHOXY-CROTONYLIDENE) - TETRAHYDROTHIAZOLE 2.5 grams of 5-(ω-diacetyl-vinyl)-N-methyl-rhodanic acid, (prepared as in Example 2a), 5.5 ccs. of ethyl-ortho-formate, 9 ccs. of absolute ethyl alcohol and a drop of concentrated sulphuric acid were mixed together and allowed to stand for 3 days. The desired dyestuff intermediate which precipitated from solution was filtered off and recrystallised from methyl alcohol. It was obtained as matted yellow needles, melting at 149° C.

EXAMPLE 6

PREPARATION OF 2-THIO-3-ETHYL-4-KETO-5-(γ-ETHOXY-CROTONYLIDENE) -TETRAHYDRO- THIAZOLE (a) 5 gms. of 5-(ω-diacetyl-vinyl)-N-ethyl-rhodanic acid, 7 ccs. of ethyl-ortho-formate, 11.4 ccs. of absolute ethyl alcohol and a drop of concentrated sulphuric acid was reacted together as in Example 5. The dyestuff intermediate was thus obtained as a light yellow crystalline solid melting at 127° C.

(b) *Alternative preparation of the same dyestuff intermediate*

5 gms. of 5-(ω-diacetyl-vinyl)-N-ethyl-rhodanic acid, 9 ccs. of methyl alcohol, 7 ccs. of ethyl-ortho-formate and a few drops of methyl alcohol containing dry hydrochloric acid gas were reacted together as in (a), yielding the product as before.

EXAMPLE 7

PREPARATION OF 2-THIO-3-METHYL-4-KETO - 5-(γ-ETHOXY-CROTONYLIDENE) - TETRA - HYDRO-OXAZOLE 3.5 gms. of 5-(ω-diacetyl-vinyl)-N-methyl-oxarhodanic acid, 5.4 ccs. of ethyl ortho formate, 8.9 ccs. of ethyl alcohol and 1 drop of concentrated sulphuric acid were mixed together and allowed to stand for 7 days with intermittent warming to dissolve the reactants. The solid present was then filtered off, washed with ethyl alcohol and purified by boiling out with the ethyl alcohol. The product consisted of matted yellow needles, M. P. 165° C.

EXAMPLE 8

PREPARATION OF THE DYESTUFF INTERMEDIATE 2-THIO-4-KETO-5-(γ - ETHYLTHIO - CROTONYLIDENE) -TETRAHYDRO-THIAZOLE (a) *Preparation of 5-(ω-diacetyl-vinyl)-rhodanic acid*

5.32 gms. of rhodanic acid, 8.0 gms. of ethoxy methylene acetyl acetone and 20 ccs. of ethyl alcohol were heated under a reflux condenser and 5.6 ccs. triethylamine was added. The mixture was heated for 20 minutes, after which time the solution was a deep red-orange colour. The solution was cooled, diluted and acidified with 2.4 ccs. acetic acid, and the solid removed by filtration, washed with water and then with a little ethyl alcohol. After recrystallisation from ethyl alcohol, the product was obtained as a light brown solid, M. P. 200° C. with decomposition.

(b) *Preparation of the dyestuff intermediate*

2.43 gms. of 5-(ω-diacetyl-vinyl)-rhodanic acid, 4.4 ccs. of ethyl mercaptan, 1.24 ccs. of methyl iodide and 20 ccs. of methyl alcohol were mixed together and allowed to stand in a sealed flask for 3–4 days when the solid went into solution and crystals of a new solid were formed. This was removed by filtration, washed with methyl alcohol and then recrystallised from methyl alcohol. The product thus obtained was a light brown solid which melted at 154° C.

EXAMPLE 9

PREPARATION OF 2-THIO-4-KETO-5-(γ-ETHOXY CROTONYLIDENE) -TETRAHYDRO-THIAZOLE 2.43 gms. 5-(ω-diacetyl-vinyl)-rhodanic acid prepared as in Example 8a, 3.73 ccs. of ethyl ortho formate, 6.1 ccs. of ethyl alcohol and 1 drop of concentrated sulphuric acid were reacted together as in Example 7. The product was obtained as a dark yellow solid, M. P. 213° C.

EXAMPLE 10

PREPARATION OF THE DYESTUFF INTERMEDIATE 2-THIO-4-KETO-5-(γ-ETHYLTHIO-γ-ETHYL-ALLYL-IDENE) -TETRAHYDRO-THIAZOLE (a) *Preparation of 5-(ω-dipropionyl-vinyl)-N-methyl-rhodanic acid*

3.0 gms. of N-methyl rhodanic acid, 5.0 gms. of ethoxy-methylene-dipropionyl methane and 20 ccs. of ethyl alcohol were heated under a reflux condenser and 3 ccs. of triethylamine was added. The mixture was boiled for 30 minutes when a deep orange colour developed. The solution was then cooled, diluted with water and acidified with 2 ccs. of acetic acid, when the product was precipitated as an oily solid. This solid was removed by filtration, washed with water and ethyl alcohol and then recrystallised from ethyl alcohol. It was thus obtained as light brown needles, M. P. 120° C.

(b) *Preparation of the dyestuff intermediate*

2.3 gms. of 5-(ω-dipropionyl-vinyl)-N-methyl-rhodanic acid, 4.0 ccs. of ethyl mercaptan, 1 cc. of methyl iodide and 15 ccs. of methyl alcohol were allowed to stand for 48 hours and the product separated as in Example 8b. The product was obtained after recrystallisation from methyl alcohol as brown crystals, with a blue reflex, M. P. 121° C.

The dyestuff intermediates of this invention are of considerable value in the production of dyestuffs capable of optically sensitising silver halide photographic emulsions. It is found that not only is the —$SR_2$ or —$OR_2$ group reactive but also the =S group in the rhodanine nucleus is reactive, which is contrary to all previous experience with such =S groups. Processes for the manufacture of dyestuffs using the intermediates of the present invention are described in copending application No. 482,493 filed on even date herewith.

What I claim is:

1. Process for the production of dyestuff intermediates which comprises condensing a compound of the general formula:

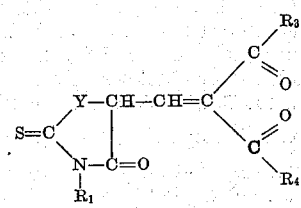

(where Y represents an atom selected from the class consisting of oxygen atoms and sulphur atoms, $R_1$ is selected from the class consisting of the hydrogen atom and hydrocarbon groups and $R_3$ and $R_4$ are each hydrocarbon groups) with a compound selected from the class consisting of compounds of the formula $R_2SH$, $(R_2S)_3CH$ and $(R_2O)_3CH$ where $R_2$ is a hydrocarbon group, in the presence of a condensing agent selected from the class consisting of mineral acids and alkyl and aralkyl salts of mineral acids and in the presence of a solvent for the reactants.

2. Process for the production of dyestuff intermediates which comprises condensing a compound of the general formula:

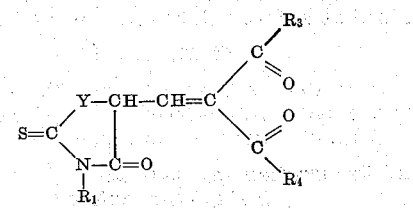

(where Y represents an atom selected from the class consisting of oxygen atoms and sulphur atoms, $R_1$ is selected from the class consisting of the hydrogen atom and hydrocarbon groups and $R_3$ and $R_4$ are each lower alkyl groups) with a lower alkyl mercaptan in the presence of a condensing agent selected from the class consisting of hydrochloric acid and alkyl and aralkyl chlorides and in the presence of a solvent for the reactants.

3. Process according to claim 2 wherein the mercaptan itself serves as the solvent for the reactants.

4. Process for the production of dyestuff intermediates which comprises condensing a compound of the general formula:

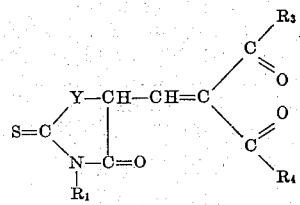

(where Y represents an atom selected from the class consisting of oxygen atoms and sulphur atoms, $R_1$ is selected from the class consisting of the hydrogen atom and hydrocarbon groups and $R_3$ and $R_4$ are each lower alkyl groups) with a trithio ortho-formic lower-alkyl ester in the presence of a condensing agent selected from the class consisting of hydrochloric acid and alkyl and aralkyl chlorides and in the presence of a solvent for the reactants.

5. Process for the production of dyestuff intermediates which comprises condensing a compound of the general formula:

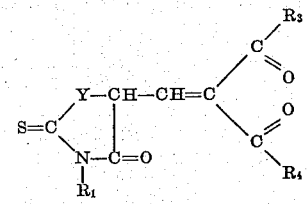

(where Y represents an atom selected from the class consisting of oxygen atoms and sulphur atoms, $R_1$ is selected from the class consisting of the hydrogen atom and hydrocarbon groups and $R_3$ and $R_4$ are each lower alkyl groups) with an ortho-formic lower-alkyl ester in the presence of a condensing agent selected from the class consisting of hydrochloric acid and alkyl and aralkyl chlorides and in the presence of a solvent for the reactants.

6. Process for the production of dyestuff intermediates which comprises condensing a compound of the general formula:

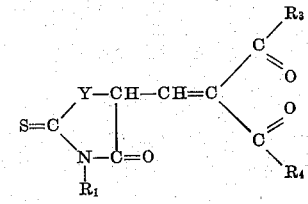

(where Y represents a sulphur atom and $R_1$, $R_3$ and $R_4$ are each lower alkyl groups) with a lower alkyl mercaptan in the presence of a condensing agent selected from the class consisting of hydrochloric acid and alkyl and aralkyl chlorides and in the presence of a solvent for the reactants.

7. Process for the production of dyestuff intermediates which comprises condensing a compound of the general formula:

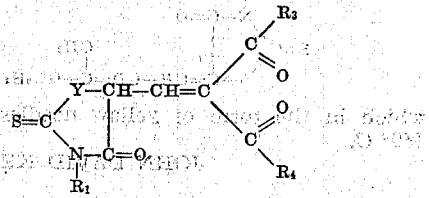

(where Y represents a sulphur atom and $R_1$, $R_3$ and $R_4$ are each lower alkyl groups) with a trithio ortho-formic lower-alkyl ester in the presence of a condensing agent selected from the class consisting of hydrochloric acid and alkyl and aralkyl chlorides and in the presence of a solvent for the reactants.

8. Process for the production of dyestuff intermediates which comprises condensing a compound of the general formula:

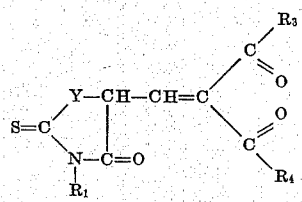

(where Y represents a sulphur atom and $R_1$, $R_3$ and $R_4$ are each lower alkyl groups) with an ortho-formic lower-alkyl ester in the presence of a condensing agent selected from the class consisting of hydrochloric acid and alkyl and aralkyl chlorides and in the presence of a solvent for the reactants.

9. Process for the production of dyestuff intermediates which comprises condensing a compound of the general formula:

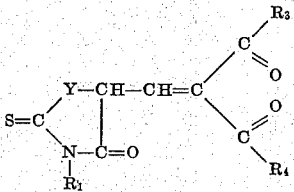

(where Y represents a sulphur atom and $R_1$, $R_3$ and $R_4$ are each lower alkyl groups) with a lower alkyl mercaptan in the presence of methyl iodide and a solvent for the reactants.

10. Process for the production of dyestuff intermediates which comprises condensing a compound of the general formula:

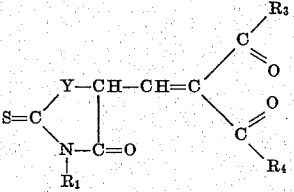

(where Y represents a sulphur atom and $R_1$, $R_3$ and $R_4$ are each lower alkyl groups) with a trithio ortho-formic lower-alkyl ester in the presence of methyl iodide and a solvent for the reactants.

11. Process for the production of dyestuff intermediates which comprises condensing a compound of the general formula:

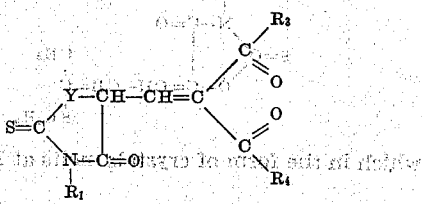

(where Y represents a sulphur atom and $R_1$, $R_3$ and $R_4$ are each lower alkyl groups) with an ortho-formic lower-alkyl ester in the presence of methyl iodide and a solvent for the reactants.

12. Dyestuff intermediates of the general formula:

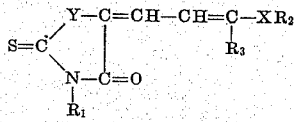

where X and Y are each selected from the class consisting of sulphur atoms and oxygen atoms, $R_1$ is selected from the class consisting of the hydrogen atom and hydrocarbon groups, and $R_2$ and $R_3$ are separate hydrocarbon groups.

13. Dyestuff intermediates of the general formula:

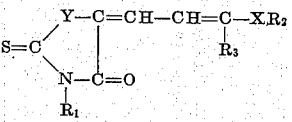

where X and Y are each selected from the class consisting of sulphur atoms and oxygen atoms, $R_1$ is selected from the class consisting of the hydrogen atom and hydrocarbon groups, and $R_2$ and $R_3$ are lower-alkyl groups.

14. Dyestuff intermediates of the general formula:

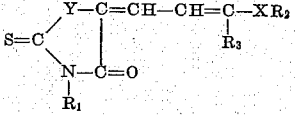

where X and Y are each selected from the class consisting of sulphur atoms and oxygen atoms and $R_1$, $R_2$ and $R_3$ are each lower alkyl groups.

15. Dyestuff intermediates of the general formula:

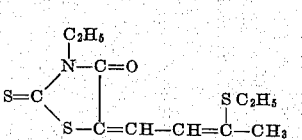

where X and Y are each sulphur atoms and $R_1$, $R_2$ and $R_3$ are each lower alkyl groups.

16. A compound of the formula:

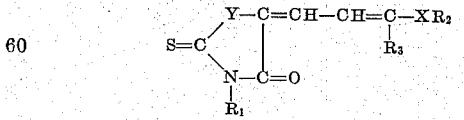

which in the form of light crystals melts at 116° C.

17. A compound of the formula:
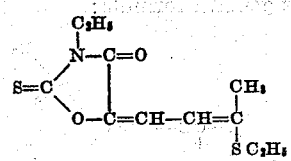
which in the form of crystals melts at 157° C.
18. A compound of the formula
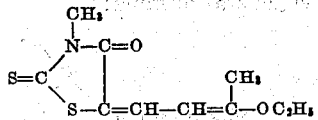
which in the form of yellow needles melts at 149° C.
JOHN DAVID KENDALL.